June 9, 1964 G. A. MATTHEWS 3,136,980

MAGNETIC CORE MEMORY MATRICES

Filed Dec. 14, 1959 6 Sheets-Sheet 1

INVENTOR
GEORGE A. MATTHEWS

BY Craig & Freudenberg
ATTORNEY

INVENTOR
GEORGE A. MATTHEWS
BY Craig & Freudenberg
ATTORNEY

June 9, 1964 G. A. MATTHEWS 3,136,980

MAGNETIC CORE MEMORY MATRICES

Filed Dec. 14, 1959 6 Sheets-Sheet 3

INVENTOR

GEORGE A. MATTHEWS

BY Craig & Freudenberg

ATTORNEY

June 9, 1964 G. A. MATTHEWS 3,136,980

MAGNETIC CORE MEMORY MATRICES

Filed Dec. 14, 1959 6 Sheets-Sheet 4

INVENTOR
GEORGE A MATTHEWS

BY Craig & Freudenberg
ATTORNEYS

June 9, 1964 G. A. MATTHEWS 3,136,980

MAGNETIC CORE MEMORY MATRICES

Filed Dec. 14, 1959 6 Sheets-Sheet 5

INVENTOR
GEORGE A MATTHEWS

BY Craig & Freudenberg
ATTORNEYS

June 9, 1964 G. A. MATTHEWS 3,136,980

MAGNETIC CORE MEMORY MATRICES

Filed Dec. 14, 1959 6 Sheets-Sheet 6

INVENTOR

GEORGE A MATTHEWS

BY Craig & Freudenberg

ATTORNEY.

United States Patent Office 3,136,980 Patented June 9, 1964

3,136,980

MAGNETIC CORE MEMORY MATRICES

George A. Matthews, Beeston, Nottingham, England, assignor to Ericsson Telephones Limited, London, England, a British company Filed Dec. 14, 1959, Ser. No. 859,268
Claims priority, application Great Britain Dec. 15, 1958
21 Claims. (Cl. 340—172.5)

Figure 1:
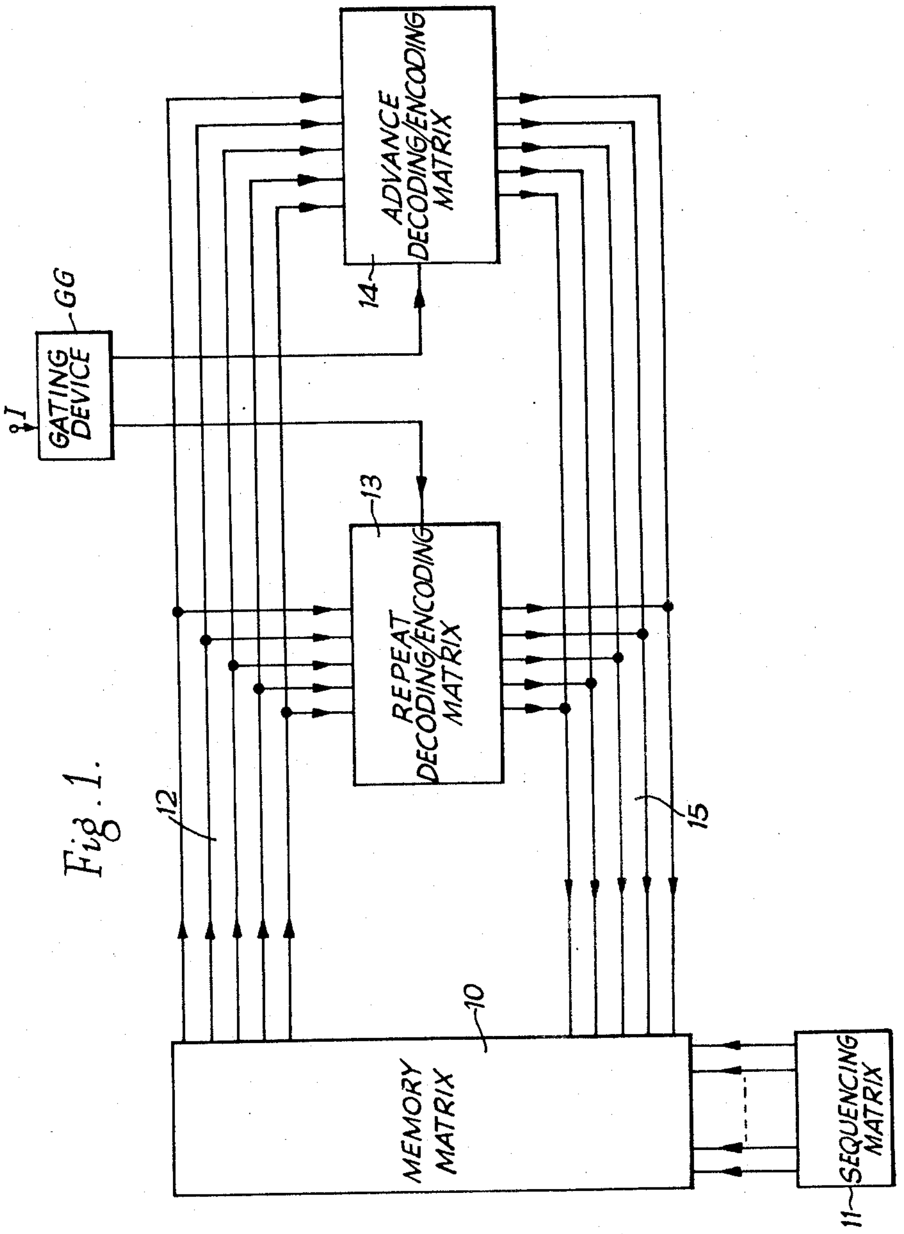

The present invention relates to apparatus comprising magnetic core memory matrices, that is matrices of magnetic cores each adapted to assume alternatively one of two states of magnetisation, hereinafter referred to as the "0" state and the "1" state, and provided with an arrangement of associated windings whereby selected combinations of cores may be set to the "1" state to store information in the matrix in a predetermined code.

The invention is concerned with apparatus employing matrices of the type having a plurality of groups of cores, hereinafter referred to as columns of cores, each column storing a separate item of information in the predetermined code, the matrix being provided with a control circuit adapted to operate sequentially and repeatedly to cause or allow information to be read out of and written in to each column of cores in turn.

Such matrices are used in equipment usually referred to as electronic computing equipment or electronic data-processing equipment. Important examples of such equipment are to be found in automatic telephone exchanges.

It is commonly required to operate a matrix of the type defined in such a way that the information stored in each column of cores is read out and then written back into the cores unmodified if a first condition obtains but modified in a predetermined manner if a second condition obtains, this procedure being followed sequentially and repeatedly through all the columns of cores.

The information will usually be numerical and the first condition will then be one requiring the number to remain unchanged. The second condition may require the number to be increased or decreased by some predetermined amount or to have some other mathematical operation performed upon it.

It is an object of the present invention to provide improved apparatus employing a matrix of the type defined, in which the requirement set out above is met.

According to the invention there is provided apparatus comprising a main matrix of the type defined, first and second temporary storage magnetic core stores and an arrangement of circuits, including windings associated with the cores of the matrix and the stores, coupling the matrix to both stores in such a manner that an item of information can be read out of a column of cores of the main matrix and stored temporarily in each of the stores and be written back into the column of cores from either store, the arrangement of circuits being further characterised in that when the information is written back from the first store it is written back in unmodified form and that when the information is written back, from the second store it is written back modified in a predetermined manner, and the system further comprising a gating device responsive to a signal indicative of whether a first or a second condition obtains to cause information to be written back into the main matrix from the first or the second store according as to whether the first or the second condition respectively obtains.

Embodiments of the invention will usually be required to deal with numerical information, each item of information being a number. The predetermined modification can then consist in the addition or subtraction of a specified number, for instance, one, to or from the number which is the item of information.

A system according to the invention adapted to deal with items of information which are numbers can comprise a further temporary storage magnetic core store and be such that when a number is written back from the second store, one, for example, is added to it and when a number is written back from the further store, one, for example, is subtracted from it. In this instance the gating device will be responsive to a signal indicating which of three possible conditions obtains to control the stores accordingly. The three conditions will indicate respectively: I, leave the number unmodified, II, add one to the number, III, subtract one from the number.

The first temporary storage store need have only as many cores as there are in each column of the main matrix since it only has to store the information from one column at a time. Moreover, the cores may have a one-to-one correspondence with the cores respectively of each column in the main matrix, the same correspondence obtaining both with respect to the transfer of information from a column of the main matrix to the first store and with respect to the transfer of information back again. That is to say, if the cores of each column in the main matrix and of the first store are assumed to be numbered 1 to $n$, a general core having the number $r$, when, in read out of information, a core $r$ in one column of the main matrix is reset, the core $r$ in the first store is set and, when the same information is written back, the core $r$ in the first store is reset, resulting in the core $r$ in the said one column being set.

This simple correspondence is of course achieved by appropriate coupling of cores in the main matrix with those in the first store. In general, even when the first store has more cores than there are in each column of the main matrix, it may be said that the couplings used to effect read out of information from the main matrix to the first store and re-writing of the information in the main matrix are such that read out takes place in accordance with a predetermined translation code (which may consist in simple one-to-one correspondence as just explained), whereas writing back takes place in accordance with a re-translation code which is the exact converse of the translation code.

In the case of the second store, or any further store causing modification of information in write-back, the couplings are such that writing back takes place in accordance with a re-translation code which differs from the converse of the translation code in such a way as to give rise to the required modification. It will be appreciated that it is merely a question of definition as to whether information stored in the second store is regarded as the same information as was previously held in the main matrix or as the modified information, which will be written back into the main matrix if rewriting takes place from that store. In this specification the information is referred to in the terms of the former alternative for convenience.

In both temporary storage stores of all but one of the embodiments of the invention, each item of information is stored as a switching to its alternative state of one core only. Under these circumstances it is appropriate to substitute for the term "translation" and "re-translation" used above, the term "decoding" and "encoding," since "decoding" may be taken to be translation from a code such as the "2 out of 5" code or binary code into "1 out of *n*" code and "encoding" may be taken to be re-translation from "1 out of *n*" code into another code. When the information is stored in a store in this way the store will have more cores than there are in each column of the main matrix, having in fact one core for each possible code combination of cores in a column of the matrix. The store may then be referred to a "decoding/encoding matrix."

It is much preferred to make the second store, and any other store functioning to modify information, a decoding/encoding matrix since this simplifies the couplings between its cores and those of the main matrix. Each core in the decoding/encoding matrix corresponds to one core combination of each column of the main matrix so far as read out from the main matrix is concerned and to a different core combination of each column of the main matrix so far as re-writing is concerned.

It will be appreciated both from the foregoing paragraphs and the following more detailed description that embodiments of the invention can take a very large number of different forms. In systems employing large numbers of magnetic cores a very large number of variations can be made in the connections and senses of the windings associated with the cores.

Figure 2:
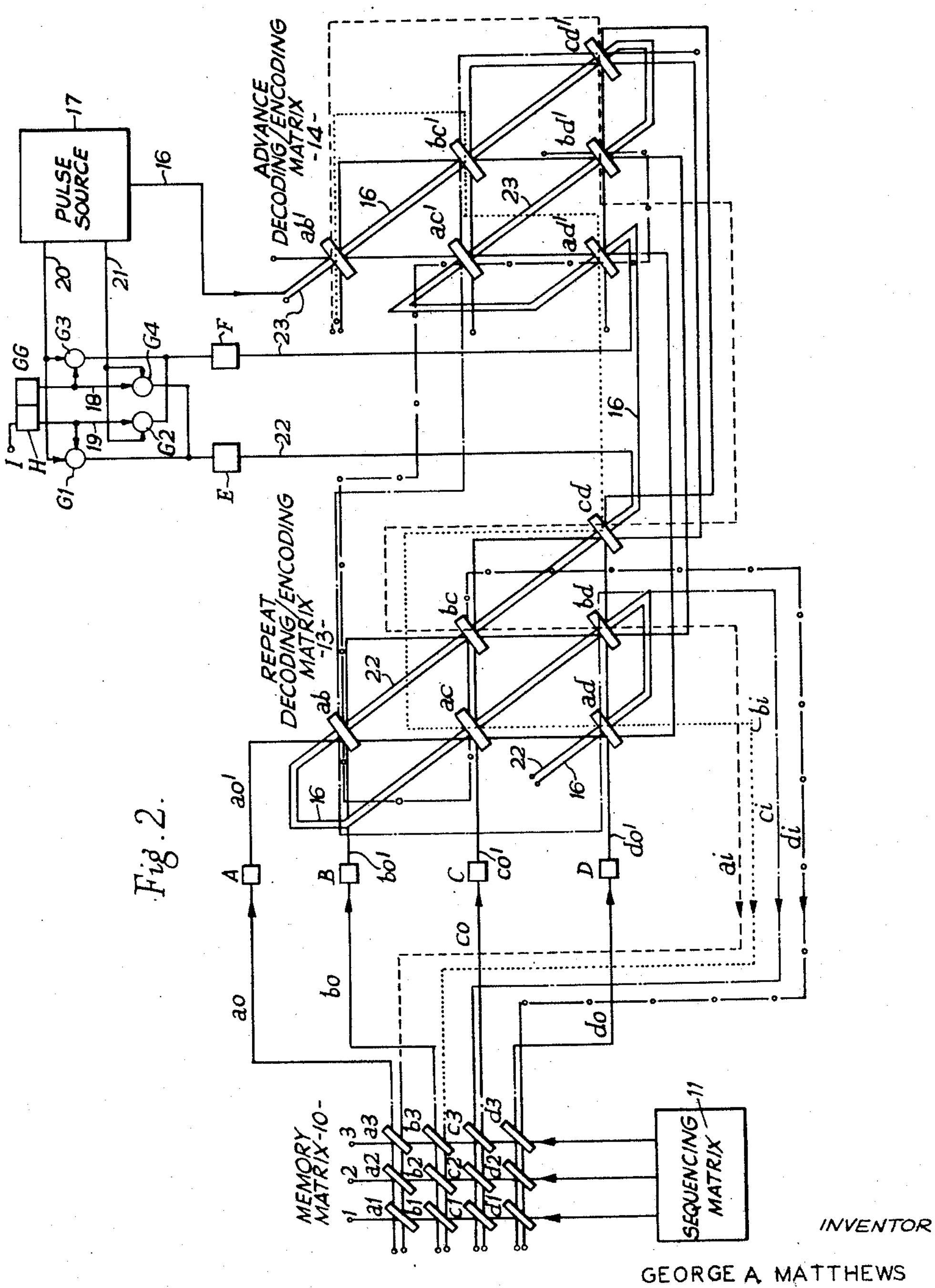
Figure 3:
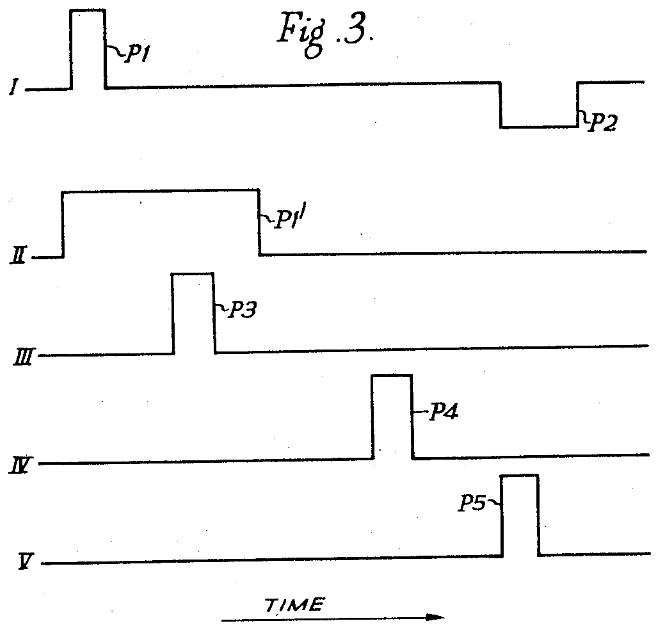
Figure 5:
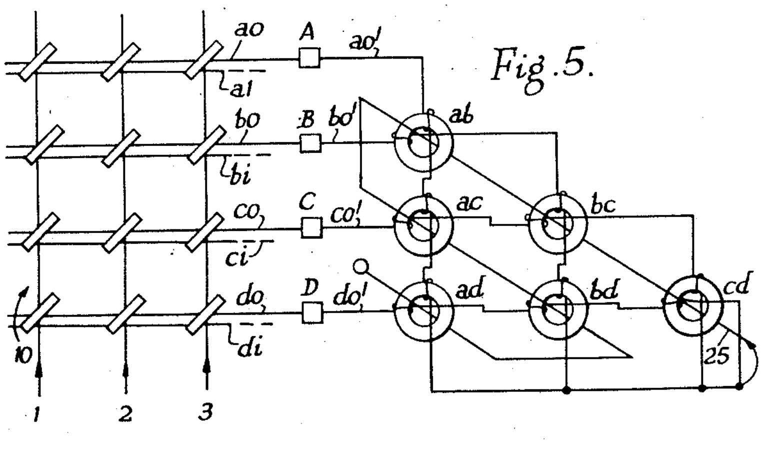
Figure 4:
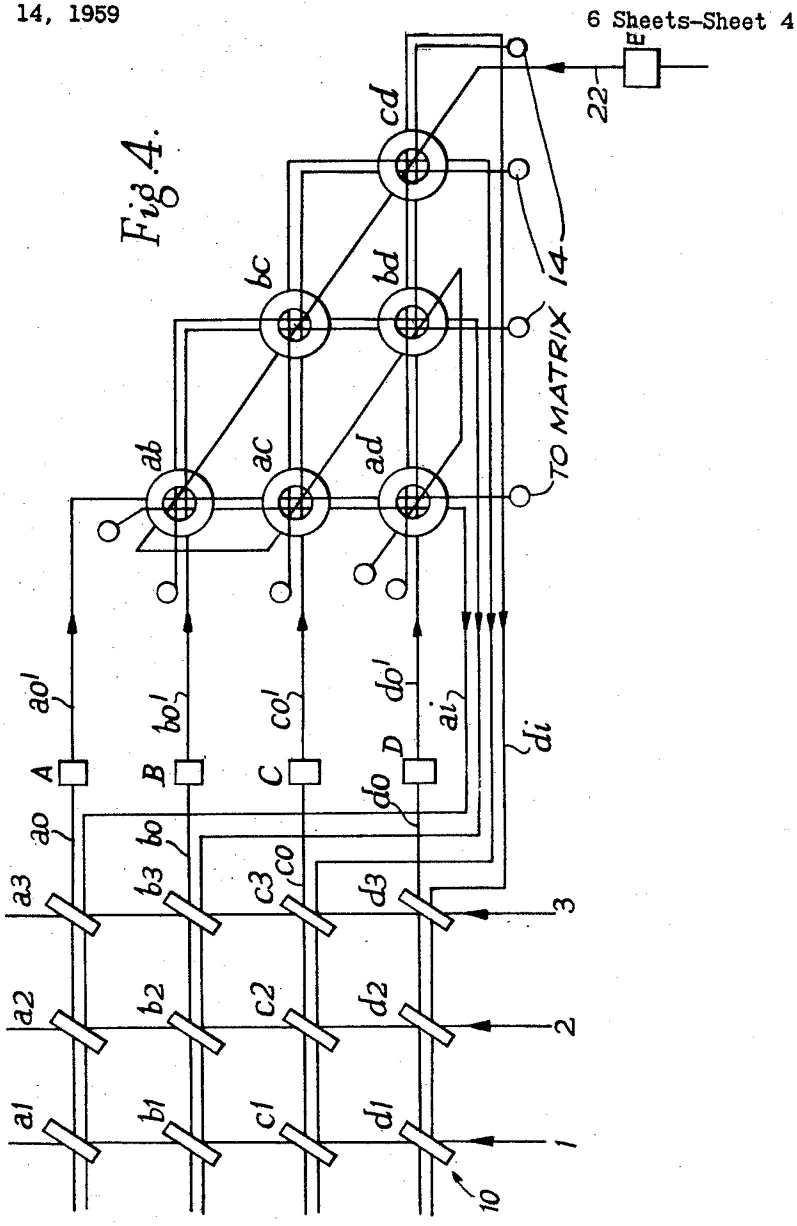
Figure 6:
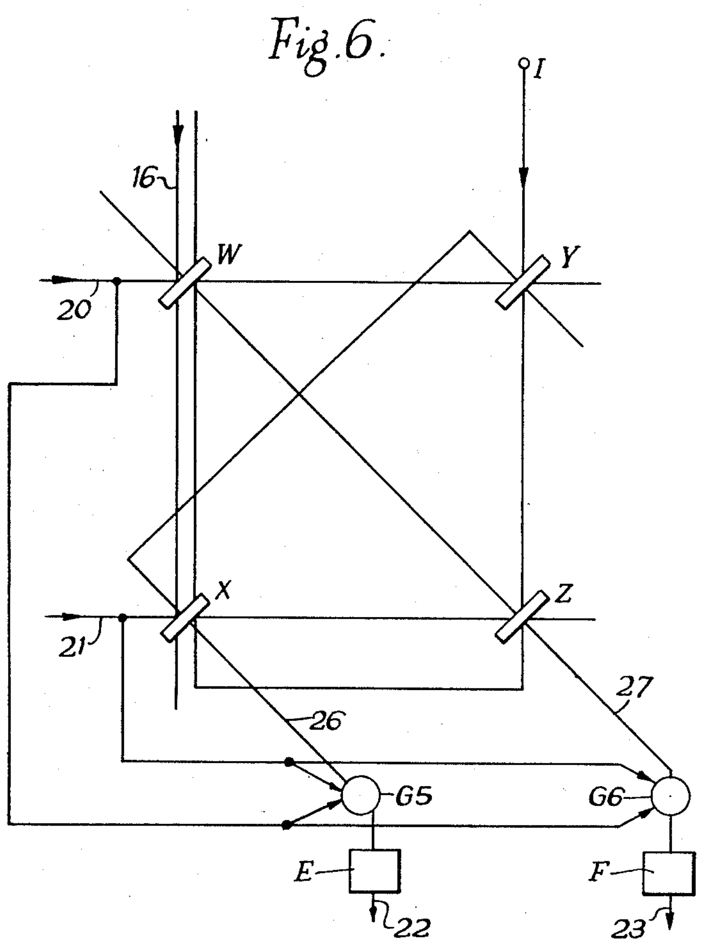
Figure 7:
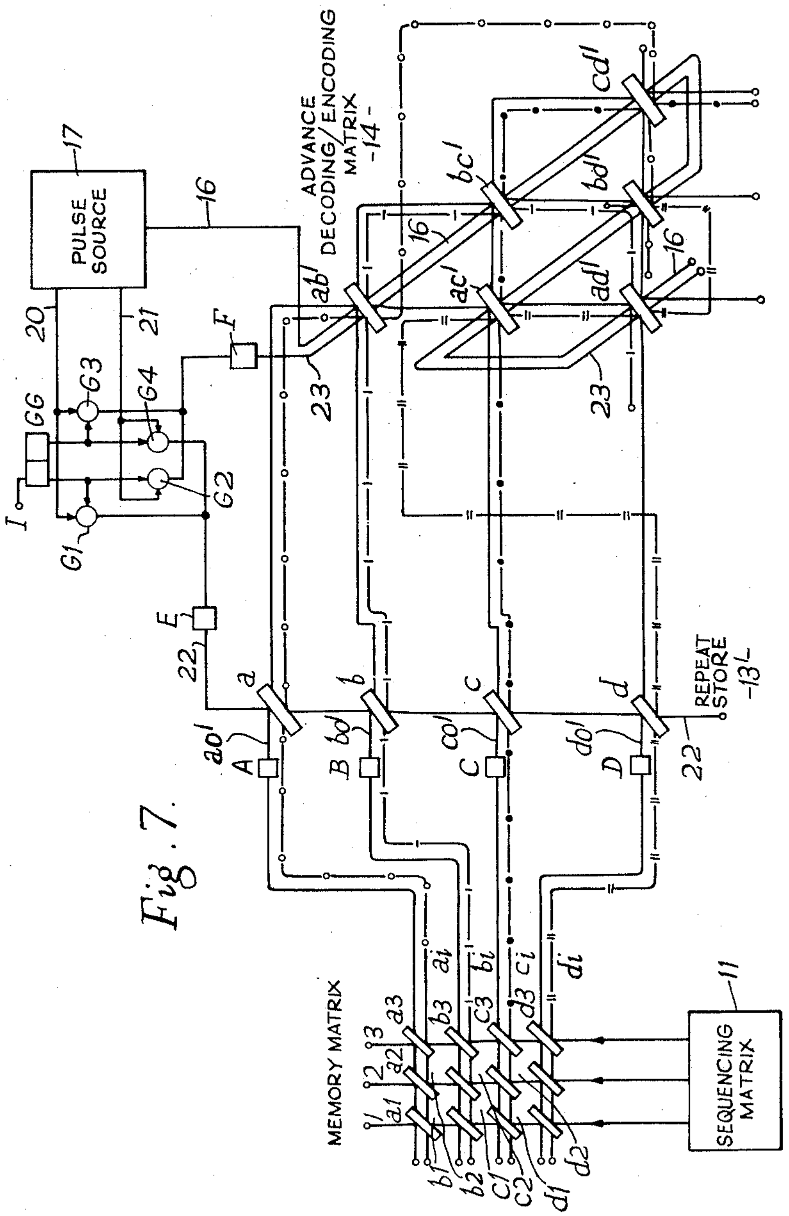

The invention will now be described by way of example with reference to the accompanying drawings, in which:

FIG. 1 is a block circuit diagram showing the broad features of one embodiment of the invention, FIG. 2 is a schematic circuit diagram showing the embodiment in greater detail, FIG. 3 is a diagram showing the timing of certain pulses occurring during one cycle of operation of the embodiment, FIGS. 4 and 5 are schematic circuit diagrams illustrating modifications to the circuit of FIG. 2, FIG. 6 is a diagram of an alternative gating device for use in the foregoing embodiments of the invention, and FIG. 7 is a diagram similar to FIG. 2 sharing a simplified embodiment of the invention.

Throughout the following description no attempt has been made to indicate the senses of the different windings and accordingly the senses of the pulses shown in FIG. 3 are in general of no significance, the diagram serving only to show the timing of the pulses. The description however is sufficient to allow one skilled in the art to select a convenient arrangement of windings to be used with operating pulses of chosen polarities in order to achieve the results stated.

Referring now to FIG. 1, a memory matrix 10 has a large number, say 100, of columns of magnetic cores, each column containing 5 cores. Each of the columns is adapted to store one of the numbers 1 to 10 in the "two out of five" code. Thus in any column if the first and second stores are in the "1" state the number 1 is stored, if the first and third cores are in the "1" state the number 2 is stored, and so on.

The matrix is driven by a control circuit in the form of a sequencing matrix 11 which may be as described in the specification accompanying a copending application No. 848,689, now abandoned. The sequencing matrix is adapted to apply a pair of pulses to each column of cores in turn. The first pulse is a "full read" pulse of magnitude and sense such that any cores in the column in the "1" state are returned to the "0" state. Corresponding pulses are generated is appropriate ones of five leads 12 coupled to two temporary storage matrices or stores of which one is a "repeat" decoding/encoding matrix 13 and the other an "advance" decoding/encoding matrix 14. Both these matrices decode the number in the "two out of five" code and store it in the "one out of ten" code.

Some time after the first pulse of the pair has occurred, the second pulse is generated. This is a "half-write" pulse of opposite sense to the "full read" pulse and such smaller magnitude that further "half-write" pulses must be applied to cores of the column via appropriate ones of five leads 15 in order to switch those cores back to the "1" state. The leads 15 are output leads of the matrices 13 and 14 and it is arranged that one or the other of these matrices recodes in the "two out of five" code the number stored therein and provides the pulses in the leads 15, coincident with the "half-write" pulse from the matrix 11. This occurs under the control of a gating device GG having an input terminal I. If no input is applied to this terminal the matrix 13 provides the coincident pulses and these pulses are applied to the same cores as generated the pulses in the leads 12. If an input is applied, indicating one is to be added to the number, the matrix 14 provides the coincident pulses and these are applied to the cores representing the number one above that represented by the cores which generated the pulses in the leads 12.

For the purpose of a more detailed explanation, considerable simplifications have been made in FIG. 2. Each column of the memory matrix 10 as shown only stores the number 1 to 6 in the "two out of four code," and ensuing simplifications have been made to the matrices 13 and 14. Furthermore, only three columns of cores have been shown in the matrix 10. This latter simplification does not affect the matrices 13 and 14 which are employed to deal with all the columns in turn. In this and subsequent figures return connections for the various cores have not been shown. These can be made through earth in most instances.

Thus in FIG. 2 the sequencing matrix 11 has three output or read leads 1, 2 and 3 having read windings associated with three columns, each having four cores *a* to *d*. The numeral following the letter *a*, *b*, *c* or *d* indicates the column of the core, the letters indicating four rows. Each row of cores is provided with a "read out" lead *ao*, *bo*, *co*, *do*, having windings on the cores in the corresponding row. These leads correspond to the leads 12 in FIG. 1.

In operation the matrix 11 first applies a "full read" pulse, P1 in waveform I of FIG. 3, to one of the leads 1, 2 and 3, say the lead 1, switching the two cores in the first column which are in the "1" state to the "0" state. Output pulses are produced in two of the leads *ao* to *do* (since a "two out of four" code is used), and these pulses are amplified and lengthened by amplifiers A, B, C and D in leads *ao* to *do* producing pulses as shown at P1′ in waveform II of FIG. 3. The lengthened pulses are applied through leads *ao′* to *do′* to bias cores of the matrices 13 and 14.

The matrix 13 has six cores *ab*, *ac*, *ad*, *bc*, *bd* and *cd*. The leads *ao′* to *do′* having inhibit windings on these cores as shown in the following table:

*Table I*

| Lead | Cores having windings thereon |
|---|---|
| *ao′* | *ab ac ad* |
| *bo′* | *ab bc bd* |
| *co′* | *ac bc cd* |
| *do′* | *ad bd cd* |

The cores of the matrix 13 are initially in the "0" state and the pulses P1′ are caused to bias the cores further in the sense of magnetisation of the "0" state.

As will be seen from FIG. 2 and Table I, one core of the matrix 13 remains unbiased when any two of the leads *ao′* to *do′* have pulses P1′, provided therein and the cores corresponding to the different combinations of leads are given in Table II:

*Table II*

| Leads in which pulses P1' are provided | Unbiased core of matrix 13 | Number represented |
|---|---|---|
| *ao'*, *bo'* | *cd* | 1 |
| *ao'*, *co'* | *bd* | 2 |
| *ao'*, *do'* | *bc* | 3 |
| *bo'*, *co'* | *ad* | 4 |
| *bo'*, *do'* | *ac* | 5 |
| *co'*, *do'* | *ab* | 6 |

All the cores of the matrix 13 have drive windings in a drive lead 16 connected to a source 17 of pulses. The source 17 is synchronised with the sequencing matrix and shortly after the latter has applied a pulse P1, and within the duration of the ensuing pulses P1', the source 17 applies a pulse P3 (waveform III in FIG. 3), to the lead 16. This is of magnitude and sign such that the unbiased or uninhibited core only in the matrix 13 is switched to the "1" state.

Thus on completion of the operations so far described the information previously stored in "two out of four" code in one column of the matrix 10 is stored in "one out of six" code in the matrix 13. The matrix 14 is exactly the same as the matrix 13 to the extent that this has as yet been described, that is so far as its functions as a decoding matrix is concerned. Thus, for example, the lead *ao'* has windings associated with cores *ab'*, *ac'* and *ad'* of the matrix 14. Furthermore the lead 16 has windings associated with all the cores of the matrix 14. Accordingly when, for example, the core *cd* in the matrix 13 is set to the "1" state the core *cd'* in the matrix 14 is also set to the "1" state. Although the cores in the two matrices are set to the "1" state simultaneously, they are returned to the "0" state in succession. As will become clear, only the second core to be reset is effective to write information back into the column of the matrix 10 and the order in which the cores are reset is controlled by the gating device GG.

Four write leads *ai* to *di*, corresponding to the leads 15 in FIG. 1, have output windings associated with cores of the matrices 13 and 14. The lead *ai* has write windings associated with all the cores *a*1 to *a*3 in the matrix 10 and so on. When a core in the matrix 13 or 14 is reset to the "0" state it produces "half write" pulses in two of the leads *ai* to *di* and if, but only if, these coincide with the "half-write" pulse P2 in a lead 1, 2 or 3, two cores in the first, second or third column are set to the "1" state. In this way information is written back into the columns of the matrix 10.

The following table (which may be checked against FIG. 2) shows the leads *ai* etc., in which "half-write" pulses are produced when the various cores of the matrices 13 and 14 are reset to the "0" state. The table also shows the numbers represented by the different combinations.

*Table III*

| Core reset to the "0" state | Half-write pulses produced in leads | Number represented |
|---|---|---|
| *ab* | *ci*, *di* | 6 |
| *ac* | *bi*, *di* | 5 |
| *ad* | *bi*, *ci* | 4 |
| *bc* | *ai*, *di* | 3 |
| *bd* | *ai*, *ci* | 2 |
| *cd* | *ai*, *bi* | 1 |
| *ab'* | *ai*, *bi* | 1 |
| *ac'* | *ci*, *di* | 6 |
| *ad'* | *bi*, *di* | 5 |
| *bc'* | *bi*, *ci* | 4 |
| *bd'* | *ai*, *di* | 3 |
| *cd'* | *ai*, *ci* | 2 |

Comparing Tables II and III it will be seen that the operation of this simplified embodiment of the invention can be summarised as follows:

(i) When a number $x$ is read out of a column of the matrix 10 and a core of each matrix 13 and 14 is set to the "1" state, if the "half-write" pulses, generated in resetting to the "0" state the core in the matrix 13 are employed with the "half-write" pulse from the matrix 11 to write a number back into the column of the matrix 10, the number written back is the same number $x$.

(ii) When a number $x$ is read out of a column of the matrix 10 and a core of each matrix 13 and 14 is set to the "1" state, if the "half-write" pulses generated in resetting to the "0" state the core in the matrix 14 are employed with the "half-write" pulse from the matrix 11 to write a number back into the column of the matrix 10, the number written back is $x+1$, taking $6+1$ to be equal to 1.

The gating device GG and the manner in which the cores in the matrices 13 and 14 are reset will now be described. The gating device GG comprises a monostable flip-flop H to which the terminal I is connected. In the absence of an input to this terminal the flip-flop H produces an output on a lead 18 connected to two "and-gates" G3 and G4. An input (representing the instruction "add one"), applied to the terminal I sets the flip-flop H to an alternative state in which an output is produced on a lead 19 connected to two further "and-gates" G1 and G2. Any input applied to the terminal I is arranged to occur at such a time, and the duration of the alternative state of the flip-flop is arranged to be such that the flip-flop is in its alternative state for the whole of the interval during which two successive erase pulses P4 and P5 shown in FIG. 3 occur.

These pulses are generated by the pulse source 17. The pulse P4 is applied to a lead 20 connected to the gates G1 and G3 and the pulse P5 is applied to a lead 21 connected to the gates G2 and G4. As shown in FIG. 3, the pulse P4 is generated before the pulse P2 and the pulse P5 is coincident with the pulse P2.

The output terminals of the gates G1 and G4 are connected to an amplifier E, the output lead 22 of which has windings associated with all the cores of the matrix 13. An output from either of the gates G1 and G4 erases the information in the matrix 13, causing any core in the matrix 13 in the "1" state to be returned to the "0" state. The output terminals of the gates G2 and G3 are connected to an amplifier F, the output lead 23 of which has windings associated with all the cores of the matrix 14. An output from either of the gates G2 and G3 erases the information in the matrix 14, causing any core in the matrix 14 in the "1" state to be returned to the "0" state.

If no signal has been applied to the terminal I and the lead 18 is energized, on the application of the pulse P4 the gate G3 produces an output and the core in the matrix 14 in the "1" state is returned to the "0" state. The "half-write" pulses thereby produced are not coincident with the pulse P2 and do not cause information to be written into the matrix 10. On the application of the pulse P5 the gate G4 produces an output and the core in the repeat matrix 13 in the "1" state is returned to the "0" state. The "half-write" pulses thereby produced are coincident with the pulse P2 and cause information, (the number previously read-out) to be written into the matrix 10.

FIG. 4 shows a modified form of the matrix 13. (The matrix 14 may be correspondingly modified.) The windings in the leads *ao'* to *do'* are arranged as in FIG. 2 but the lead 16 and the windings therein are omitted.

In operation it is arranged that the pulses in two of the read leads *ao'* to *do'* switch to the "1" state that one core of the matrix having windings in both the leads. The pulses in the leads *ao'* to *do'* are thus "half-write" pulses with respect to the cores of matrix 13 and the windings coupled to the cores of the matrix 13 are drive windings instead of inhibit windings.

Thus it will be seen that, as a decoder, the matrix 13 shown in FIG. 4 operates in accordance with the following table:

*Table IV*

| Leads in which pulses are provided | Core switched to "1" state | Number represented |
|---|---|---|
| *ao′ bo′* | *ab* | 1 |
| *ao′ co′* | *ac* | 2 |
| *ao′ do′* | *ad* | 3 |
| *bo′ co′* | *bc* | 4 |
| *co′ do′* | *bd* | 5 |
| *co′ do′* | *cd* | 6 |

The connections of the windings in the lead *ai* to *di* are made different from those in FIG. 2 as shown and are such that when the core *ab* is reset to the "0" state "half-write" pulses are provided in the leads *ai* to *bi* in order and write back the number 1, and so on.

Half-write pulses are appropriate to the situation obtaining in FIG. 4. It will be clear that in other situations "third-write" pulses or even other "fractional-write" pulses may be appropriate.

FIG. 5 shows a similar modification, the leads 22 and *ai* to *di* being omitted from the matrix 13 since they are arranged as shown in FIG. 4. The drive windings in the read leads *ao′* to *do′* are of $2n$ turns (shown as of 2 turns), whilst each core is provided with an inhibit winding of $n$ turns (shown as of 1 turn), in an inhibit lead 25. The lead 25 is connected in series with all the leads *ao′* to *do′*, in parallel. It is arranged that a pulse in any one of the leads *ao′* to *do′* is, by itself, sufficient to switch all the cores with windings in that lead to the "1" state. However, when two leads have pulses therein the return pulse in the lead 25 cancels the effect of one pulse at all the cores and accordingly only that core having windings in both leads is switched to the "1" state (see Table IV above).

The alternative gating device shown in FIG. 6 will now be described. The device comprises four magnetic cores W, X, Y and Z, each normally in the "0" state. The lead 16 (FIG. 2) has windings on the cores W and X and when the pulse P3 is applied in lead 16 these cores are switched to the "1" state. The terminal I is connected to windings on all the cores such that when the signal representing "add one" is applied the cores W and X are reset to the "0" state and the cores Y and Z are set to the "1" state. It is arranged to apply a signal to the terminal I only between the pulse P3 and the pulse P4. Thus just prior to the pulse P4 the cores W and X are in the "1" state if the number read out from matrix 10 is to be written back unmodified, whilst the cores Y and Z are in the "1" state if the number read out is to be written back increased by 1. The lead 20 has windings on the cores W and Y and application of the pulse P4 rests that one of these cores in the "1" state to the "0" state. The lead 21 has windings on the cores X and Z and application of the pulse P5 resets that one of these cores in the "1" state to the "0" state.

A lead 26 with windings on the cores X and Y is connected to the input terminal of an "and-gate" G5 having its output terminal connected to the input terminal of the amplifier E. A lead 27 with windings on the cores W and Z is connected to the input terminal of an "and-gate" G6 having its output terminal connected to the input terminal of the amplifier F. Both the lead 20 and the lead 21 are connected to input terminals of both the gates G5 and G6.

When the pulse P3 is applied and no pulse is subsequently applied to the terminal I, on the application of the pulse P4 the core W is returned to the "0" state and the gate G6 has two coincident input signals applied to it. These are the pulse P4 applied along the lead 20 and the pulse from the core W. The pulse P4 is made of sufficient duration to overlap the output pulse it induces. The amplifier F receives a signal from the gate G6 and generates a pulse resetting the core in the matrix 14 to the "0" state. In similar fashion the pulse P5 causes the gate G5 to produce an output signal and the core in the matrix 13 to be reset to the "0" state.

When a pulse is applied to the terminal I between the pulses P3 and P4 the cores W and X are reset to the "0" state and the cores Y and Z are set to the "1" state. The resulting output signals from the cores W and X do not affect the amplifiers E and F because only one input is applied to each of the "and-gates" G5 and G6. Thereafter the pulses P4 and P5 cause the gates G5 and G6 (in that order) to produce output signals, resetting the cores in the matrices 13 and 14.

The arrangement shown in FIG. 7 will be seen to be very similar to that shown in FIG. 2, the only difference being that the "repeat" decoding/encoding matrix 13 is replaced by a "repeat" store 13′ having only four cores *a*, *b*, *c* and *d*. These correspond respectively to the *a*, *b*, *c* and *d* rows of the memory matrix 10 and the core *a* has drive and output windings in the read and write leads *ao′* and *ai*, the core *b* has windings in the leads *bo′* and *bi* and so on. All cores also have windings in the lead 22 from amplifier E.

If, for example, the cores *a*1 and *c*1 in the first column of the matrix 10 are in their "1" states, when a pulse P1 in the lead 1 resets these cores the cores *a* and *c* in the store 13′ and the core *ac′* in the matrix 14 are set. A pulse in the lead 22 resets the cores *a* and *c* and if the pulse in the lead 22 results from the pulse P5 the resulting signals in the leads *ai* and *ci* cause the cores *a*1 and *c*1 to be set again to their "1" states, the information read out from the matrix 10 thus being written back without modification.

In any of the embodiments described it will be appreciated that a further decoding/encoding matrix could be added, having windings in the leads *ao′* to *do′* and *ai* to *di* so arranged that, when information is written back from that matrix it takes the form of the number originally read out of the main matrix minus one. Control of the three temporary storage matrices or stores could then be effected by means of a gating device fed with pulses P4, P5 and P6 of which only the latter coincided with the pulse P2. In response to signals indicating "do not modify," "add one" and "subtract one" the gating device would select which matrices were reset by which pulses P4, P5 and P6, only the matrix reset by the pulse P6 being effective to cause information to be written back into the main matrix.

I claim:

1. Apparatus comprising a main matrix having a plurality of groups of cores, each group storing a separate item of information in a predetermined code by the combination in which the cores thereof are set to the "1" state, first and second temporary storage magnetic core stores, each store having a plurality of magnetic cores, windings coupled to the cores of said matrix and said stores, circuit means including leads connecting said windings of said first store with windings of said matrix in accordance with a first read-write combination such that an item of information read out of a group of cores of said matrix may be temporarily stored in said first store and a corresponding item of information written back into said group, said corresponding item of information being unmodified circuit means including leads connecting said windings of said second store with windings of said matrix in accordance with a second read-write combination such that an item of information read out of a group of cores of said matrix may be temporarily stored in said second store and written back into said group with a predetermined modification to said item of information, there being performed on the said item of informaiton only those operations concerned with reading out and writing in, a control circuit, means coupling said control circuit to each said group of cores, said control circuit including means for sequentially and repeatedly causing items of information to be read out of said groups to said stores and subsequently allowing items of information to be written back from said stores into each of said groups in turn, an item of information read out of a group of cores being stored temporarily in both of said first and second stores, and means including a gating device operatively connected to said stores and responsive to a control signal to cause a respective item of information to be written back into said group from either said first store or said second store in accordance with an indication borne by said control signal.

2. Apparatus according to claim 1 comprising means for erasing the temporarily-stored item of information from the said stores in sequence and wherein said gating device includes means for controlling the order of said stores in said sequence, the order being different in accordance with the indication borne by said control signal and in each instance only the store occurring at a specified position in said sequence being effective, on erasure of said item of information therefrom, to write back into said main matrix.

3. Apparatus according to claim 2, wherein said control circuit comprises sequencing matrix means for applying to windings of each said group of cores in turn a pair of pulses consisting of a full read pulse and a half-write pulse, said full read pulse causing said item of information stored in a respective group to be read out and stored temporarily in each said temporary storage store, said half-write pulse being synchronised to overlap the pulses induced by erasure of said item of information from said store occurring at said specified position in said sequence and being effective with these to write an item of information, in either modified or unmodified condition as the case may be, back into the said group in said main matrix.

4. Apparatus according to claim 3, wherein said erasing means includes pulse source means for generating, following each said full-read pulse, first and second erase pulses, said second erase pulse coinciding with the half-write pulse following said full-read pulse, the order controlling means of said gating device being operatively connected to said source means to route said erase pulses to said stores respectively to erase the information therein so as to provide the aforesaid control of the order in which said stores have the information erased therefrom.

5. Apparatus according to claim 4, wherein said gating device comprises circuit means capable of assuming first and second states and having an input terminal for the application of said control signal to control said states and first and second output terminals at which a gating potential appears in the two said states respectively, first, second, third and fourth and-gates each having first and second input terminals and an output terminal, said first output terminal of the gating device circuit means being connected to said first input terminal of each of said first and second gates, said second output terminal of the gating device circuit means being connected to said first input terminal of each of said third and fourth gates, said pulse source means having first and second leads in which appear said first and second erase pulses respectively, said first lead being connected to said second input terminal of each of said first and third gates and said second lead being connected to said second input terminal of each of said second and fourth gates, lead means connected to said output terminals of said first and fourth gates, the last said lead means having windings coupled to said cores of said first store, whereby an erase pulse passing through either said first or said fourth gate erases the information stored in said first store, a further lead means connected to said output terminals of said second and third gates, said further lead means having windings coupled to said cores of said second store, whereby an erase pulse passing through either said second or said third gate erases the information stored in said second store.

6. Apparatus according to claim 5, wherein said circuit means capable of assuming first and second states normally assumes said first state, said second state being assumed for a predetermined length of time on the application of a control signal pulse to said input terminal thereof.

7. Apparatus according to claim 4, wherein said gating device comprises first, second, third and fourth magnetic cores and said pulse source means comprises first, second and third leads in which appear said first and second sequential erase pulses and a preceding setting pulse respectively, said first lead being coupled to said first and third cores and said second lead being coupled to said second and fourth cores, said third lead being coupled to said first and second cores and said setting pulse applied therein being effective to set said first and second cores to the "1" state, a first output lead, said first output lead being coupled to said second and third cores, a first and-gate having three input terminals connected to said first and second leads and said first output lead respectively and an output, a further lead connected to said output, said further lead having windings coupled to said cores of said first store, the senses of the couplings being such that, on resetting from the "1" state to the "0" state either of said second and third cores by an erase pulse, the pulses generated in said first output lead and said erase pulse together open said first gate to pass a pulse effective to reset to the "0" state any core in said first store which is in the "1" state, a second output lead, said second output lead being coupled to said first and fourth cores, a second and-gate having three input terminals connected to said first and second leads and said second output lead respectively and an output, a yet further lead connected to the last said output, said yet further lead having windings coupled to said cores of said second store, the senses of the couplings being such that, on resetting from the "1" state to the "0" state either of said first and fourth cores by an erase pulse, the pulse generated in said second output lead and said erase pulse together open said second gate to pass a pulse effective to reset to the "0" state any core in said first store which is in the "1" state, a control lead having windings coupled to all four said cores in such a sense that a pulse of predetermined polarity applied thereto between said setting pulse and said first erase pulse is effective to reset said first and second cores to the "0" state and to set said third and fourth cores to the "1" state, and means adapted to cause said pulse of predetermined polarity to be applied to said control lead.

8. Apparatus according to claim 5, wherein the lead means having windings associated with the cores of the temporary storage stores include amplifiers for amplifying the pulses applied in said lead means to erase information from said stores.

9. Apparatus according to claim 1, wherein said second store is a decoding/encoding matrix having a plurality of cores having a first one-to-one correspondence with the different code combinations (items of information), respectively, in which the cores of any group of the main matrix may be set to the "1" state, so far as read-out of information from the main matrix is concerned and a second, different one-to-one correspondence with the different code combinations so far as write-back is concerned, the arrangement of the circuit means connecting the windings of the cores in the second store to those in said main matrix being such that, when an item of information is read out of a column of the main matrix, the cores of the code combination representing the item being reset to the "0" state, the corresponding core in the second store is set to the "1" state and, when the item of information is written back from the said store, the said core is returned to the "0" state and the cores of the code combination in the said column corresponding to that core so far as write-back is concerned and representing the item of information read out modified in the predetermined manner are set to the "1" state.

10. Apparatus according to claim 1, wherein said first store is in encoding/decoding matrix having a plurality of cores in the same one-to-one correspondence with the different code combinations, (items of information,) respectively in which the cores of any group of the main matrix may be set to the "1" state so far as both readout of information from and write-back of information to the main matrix is concerned, the arrangement of the circuit means connecting windings of the cores in the first store to those in said main matrix being such that, when an item of information is read out of a group of the main matrix, the cores in the code combination representing the item being reset to the "0" state, the corresponding core in the store is set to the "1" state and, when the item of information is written back from the said store, the said core is returned to the "0" state and the cores in the said code combination representing the same said item of information are set to the "1" state.

11. Apparatus according to claim 1, wherein at least one of said stores is a decoding/encoding matrix comprising a plurality of cores each provided with a plurality of inhibit windings, a drive winding and a plurality of output windings, a plurality of read leads, said inhibit windings being connected in said read leads, said apparatus comprising a plurality of read windings coupled to said cores respectively of said main matrix, each said read lead including a read winding of one core of each group of said main matrix, a plurality of write leads, said output windings being connected in said write leads, a plurality of write windings coupled to said cores respectively of said main matrix each said write winding including a write winding of one core of each group of said main matrix, and a drive lead, said drive windings being connected in said drive lead, a source of drive pulses coupled to said drive lead, the arrangement of said circuit means connecting said one store to said main matrix being such that, on resetting to the "0" state the cores of of one code combination in one group of said main matrix, a corresponding one only of said cores in said decoding/encoding matrix does not have at least one said inhibit winding energised by the pulses induced in said read windings and flowing through said read leads, whereby that one core is switched to the "1" state by a coincident drive pulse applied to said drive lead, and on resetting to the "0" state that one core the pulses induced in the output windings coupled thereto flow through the write leads in which these windings are connected and constitute half-write pulses in said write windings in these leads.

12. Apparatus according to claim 1, wherein at least one of said stores is a decoding/encoding matrix comprising a plurality of cores each provided with a plurality of drive windings and a plurality of output windings, a plurality of read leads, said drive windings being connected in said read leads, said apparatus comprising a plurality of read windings coupled to said cores respectively of said main matrix, each said read lead including a read winding of one core of each group of said main matrix, a plurality of write leads, said output windings being connected in said write leads, a plurality of write windings coupled to said cores respectively of said main matrix, said write lead including a write winding of one core of each group of said main matrix, the arrangement of said circuit means connecting said one store to said main matrix being such that, on resetting to the "0" state the cores of one code combination in one group of said main matrix, the pulses induced in the read windings and flowing through the read leads are fractional write pulses with respect to said cores of the decoding/encoding matrix, a corresponding one only of the last said cores having sufficient of its drive windings energised to receive the effect of a full write pulse, whereby that one core is switched to the "1" state, and on resetting to the "0" state that one core the pulses induced in the output windings coupled thereto flow through the write leads in which these windings are connected and constitute half-write pulses in said write windings in these leads.

13. Apparatus according to claim 1, wherein at least one of said stores is a decoding/encoding matrix comprising a plurality of cores each provided with a plurality of drive windings, an inhibit winding and a plurality of output windings, a plurality of read leads, said drive windings being connected in said read leads, said apparatus comprising a plurality of read windings coupled to said cores respectively of said main matrix, each said read lead including a read winding of one core of each group of said main matrix, a plurality of write leads, said output windings being connected in said read leads, a plurality of write windings coupled to said cores respectively of said main matrix, each said write lead including a write winding of one core of each group of said main matrix, an inhibit lead, said inhibit windings being connected in said inhibit lead, the arrangement of said circuit means connecting said one store to said main matrix being such that, on resetting to the "0" state the cores of one code combination in one group of the main matrix, the pulses induced in the read windings and flowing through the read leads are full write pulses with respect to the cores of the decoding/encoding matrix, a corresponding one only of the last said cores having sufficient of its drive windings energised to overcome the effect of a pulse applied coincidentally to the inhibit lead, whereby that one core is switched to the "1" state, and on resetting to the "0" state that one core the pulses induced in the output windings coupled thereto flow through the write leads in which these windings are connected and constitute half-write pulses in the write windings in these leads.

14. Apparatus according to claim 13, wherein each said code combination consists of two cores, each said drive winding being of $2n$ turns, each said inhibit winding being of $n$ turns and said inhibit lead being connected in series with all said read leads in parallel.

15. Apparatus according to claim 1, wherein said first store comprises a plurality of cores in one-to-one correspondence with the cores respectively in each group of said main matrix, the arrangement of the circuit means connecting windings of the cores in said first store to those in said main matrix being such that, when an item of information is read out of a group of the main matrix, the cores in the code combination representing the item being reset to the "0" state, the corresponding cores in said store are set to the "1" state and, when the item of information is written back from said first store, the said cores are returned to the "0" state and the corresponding cores in the main matrix are re-set to the "1" state.

16. Apparatus according to claim 15, wherein each said core in said first store is provided with a drive winding and an output winding, said apparatus comprising a plurality of read leads, said drive windings being connected in said read leads respectively, a plurality of read windings coupled to said cores respectively of said main matrix, each said read lead including a read winding of one core of each group of said main matrix, a plurality of write leads, said output windings being connected in said write leads respectively, a plurality of write windings coupled to said cores respectively of said main matrix, each said write lead including a write winding of one core of each group of said main matrix, the arrangement of said circuit means connecting said first store to said main matrix being such that, on resetting to the "0" state the cores of one code combination in one group of the main matrix, the corresponding cores in the store are set to the "1" state by the pulses induced in the read windings and flowing through the read leads and drive windings, and on resetting to the "0" state those cores in the store, the pulses induced in the output windings coupled thereto flow through the write leads in which these windings are connected and constitute half-write pulses in the write windings in these leads.

17. Apparatus comprising a matrix having a plurality of groups of cores, each group storing a separate number in a predetermined code by the combination in which the cores thereof are set to the "1" state, first and second temporary storage magnetic core stores, each store having a plurality of magnetic cores, windings coupled to the cores of said matrix and said stores, circuit means including leads connecting windings of said first store with said windings of said matrix in accordance with a first read-write combination such that a number read out of a group of cores of said matrix may be temporarily stored in the said first store and a corresponding number written back into said group, said corresponding number being unmodified, circuit means including leads connecting said windings of said second store with said windings of said matrix in accordance with a second read-write combination such that a number read out of a group of cores of said matrix may be temporarily stored in said second store and written back into said group with a predetermined change in the magnitude of said number, there being performed on the said number only those operations concerned with reading out and writing in, a control circuit, means coupling said control circuit to each said group of cores, said control circuit sequentially and repeatedly causing numbers to be read out of said groups to said stores and subsequently allowing numbers to be written back from said stores into each of said groups in turn, the numbers read out of a group of cores being stored temporarily in both of said first and second stores, and gating means operatively connected to said stores and responsive to a control signal to cause said number to be written back into said group from either said first store or said second store in accordance with an indication borne by said control signal.

18. Apparatus comprising a matrix having a plurality of groups of cores, each group storing a separate item of information in a predetermined code by the combination in which the cores thereof are set to the "1" state, a plurality of temporary storage magnetic core stores, each store having a plurality of magnetic cores, winding coupled to the cores of said matrix and said stores, circuit means including leads connecting windings of one of said stores with windings of said matrix in accordance with a first read-write combination such that an item of information read out of a group of cores of said matrix may be temporarily stored in said one store and a corresponding item of information written back into said group the corresponding item of information being unmodified, circuit means including leads connecting windings of said stores other than said one store with windings of said matrix in accordance with different read-write combinations such that an item of information read out of a group of cores of said matrix may be temporarily stored in any of said other stores and written back into said group with a predetermined modification to said item of information, there being performed on the said item of information only those operations concerned with reading out and writing in, a control circuit, means coupling said control circuit to each said group of cores, said control circuit sequentially and repeatedly causing items of information to be read out of said groups to said stores and subsequently allowing items of information to be written back from said stores into each of said groups in turn, an item of information read out of a group of cores being stored temporarily in each of said stores and gating means operatively connected to said stores and responsive to a control signal to cause said item of information to be written back into said group from a selected one of said stores in accordance with an indication borne by said control signal.

19. Apparatus comprising a main matrix having a plurality of groups of cores, each group storing a separate item of information in a predetermined code by the combination in which the cores thereof are set to the "1" state, first and second temporary storage magnetic core stores, each store having a plurality of magnetic cores, windings coupled to the cores of said matrix and said stores, circuit means including leads connecting said windings of said first store with windings of said matrix in accordance with a first read-write combination such that an item of information read out of a group of cores of said matrix may be temporarily stored in said first store and a corresponding item of information written back into said group, circuit means including leads connecting said windings of said second store with windings of said matrix in accordance with a second read-write combination such that an item of information read out of a group of cores of said matrix may be temporarily stored in said second store and written back into said group with a predetermined modification to said item of information, there being performed on the said item of information only those operations concerned with reading out and writing in, a control circuit, means coupling said control circuit to each said group of cores, said control circuit including means for sequentially and repeatedly causing items of information to be read out of said groups to said stores and subsequently allowing items of information to be written back from said stores into each of said groups in turn, an item of information read out of a group of cores being stored temporarily in both of said first and second stores, and means including a gating device operatively connected to said stores and responsive to a control signal to cause a respective item of information to be written back into said group from either said first store or said second store in accordance with an indication borne by said control signal.

20. Apparatus comprising a matrix having a plurality of groups of cores, each group storing a separate number in a predetermined code by the combination in which the cores thereof are set to the "1" state, first and second temporary storage magnetic core stores, each store having a plurality of magnetic cores, windings coupled to the cores of said matrix and said stores, circuit means including leads connecting windings of said first store with said windings of said matrix in accordance with a first read-write combination such that a number read out of a group of cores of said matrix may be temporarily stored in the said first store and written back into said group, circuit means including leads connecting said windings of said second store with said windings of said matrix in accordance with a second read-write combination such that a number read out of a group of cores of said matrix may be temporarily stored in said second store and written back into said group with a predetermined change in the magnitude of said number, there being performed on the said number only those operations concerned with reading out and writing in, a control circuit, means coupling said control circuit to each said group of cores, said control circuit sequentially and repeatedly causing numbers to be read out of said groups to said stores and subsequently allowing numbers to be written back from said stores into each of said groups in turn, the numbers read out of a group of cores being stored temporarily in both of said first and second stores, and a gating means operatively connected to said stores and responsive to a control signal to cause said number to be written back into said group from either said first store or said second store in accordance with an indication borne by said control signal.

21. Apparatus comprising a matrix having a plurality of groups of cores, each group storing a separate item of information in a predetermined code by the combination in which the cores thereof are set to the "1" state, a plurality of temporary storage magnetic core stores, each store having a plurality of magnetic cores, windings coupled to the cores of said matrix and said stores, circuit means including leads connecting windings of one of said stores with windings of said matrix in accordance with a first read-write combination such that an item of information read out of a group of cores of said matrix may be temporarily stored in said one store and written back into said group, circuit means including leads connecting windings of said stores other than said one store with windings of said matrix in accordance with different read-write combinations such that an item of information read out of a group of cores of said matrix may be temporarily stored in any of said other stores and written back into said group with a predetermined modification to said item of information, there being performed on the said item of information only those operations concerned with reading out and writing in, a control circuit, means coupling said control circuit to each said group of cores, said control circuit sequentially and repeatedly causing items of information to be read out of said groups to said stores and subsequently allowing items of information to be written back from said stores into each of said groups in turn, an item of information read out of a group of cores being stored temporarily in each of said stores, and a gating means operatively connected to said stores and responsive to a control signal to cause said item of information to be written back into said group from a selected one of said stores in accordance with an indication borne by said control signal.

References Cited in the file of this patent

UNITED STATES PATENTS

| | | |
|---|---|---|
| 2,895,124 | Harris | July 14, 1959 |
| 3,018,956 | Hosier | Jan. 30, 1962 |

OTHER REFERENCES

Experiments on a Three-Core Cell for High Speed Memories," J. Raffel and S. Bradspies, IRE, Convention Record 1955, Nat'l Convention, Part 4, Computers and Information Theory, pp. 64–69.

Arithmetic Operations in Digital Computer, by R. K. Richards, particularly chapters 11 and 12, copyright 1955.